United States Patent
Geva

(10) Patent No.: US 6,539,541 B1
(45) Date of Patent: Mar. 25, 2003

(54) METHOD OF CONSTRUCTING AND UNROLLING SPECULATIVELY COUNTED LOOPS

(75) Inventor: Robert Y. Geva, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/378,632

(22) Filed: Aug. 20, 1999

(51) Int. Cl.$^7$ .................................................. G06F 9/45
(52) U.S. Cl. ...................... 717/150; 717/151; 717/160; 712/241; 712/233; 712/239
(58) Field of Search ................. 717/9, 5, 150, 717/151, 160; 712/216, 218, 233, 241, 239

(56) References Cited

U.S. PATENT DOCUMENTS

| | | | | |
|---|---|---|---|---|
| 5,361,354 A | * | 11/1994 | Greyzck ..................... | 717/160 |
| 5,526,499 A | | 6/1996 | Bernstein et al. ........... | 712/216 |
| 5,537,620 A | * | 7/1996 | Breternitz, Jr. ................ | 717/9 |
| 5,613,117 A | * | 3/1997 | Davidson et al. ............ | 717/144 |
| 5,664,193 A | * | 9/1997 | Tirumalai ...................... | 717/5 |
| 5,724,536 A | | 3/1998 | Abramson et al. .......... | 712/216 |
| 5,778,210 A | | 7/1998 | Henstrom et al. .......... | 712/218 |
| 5,797,013 A | * | 8/1998 | Mahadevan et al. .......... | 717/9 |
| 5,802,337 A | | 9/1998 | Fielden ....................... | 712/216 |
| 5,809,308 A | * | 9/1998 | Tirumalai ...................... | 717/9 |
| 5,835,776 A | * | 11/1998 | Tirumalai et al. .............. | 717/9 |
| 5,842,022 A | * | 11/1998 | Nakahira et al. .............. | 717/9 |
| 5,854,933 A | * | 12/1998 | Chang ............................. | 717/9 |
| 5,854,934 A | * | 12/1998 | Hsu et al. ...................... | 717/9 |
| 5,862,384 A | | 1/1999 | Hirai ............................... | 717/9 |
| 6,035,125 A | * | 3/2000 | Nguyen et al. ................ | 717/9 |
| 6,145,076 A | * | 11/2000 | Gabzdyl et al. ............ | 712/241 |
| 6,192,515 B1 | * | 2/2001 | Doshi et al. .................... | 717/9 |
| 6,247,173 B1 | * | 6/2001 | Subrahmanyam .............. | 717/9 |
| 6,263,427 B1 | * | 7/2001 | Cummins et al. ........... | 712/236 |
| 6,263,489 B1 | * | 7/2001 | Olsen et al. ................. | 717/129 |
| 6,269,440 B1 | * | 7/2001 | Fernando et al. ........... | 709/106 |
| 6,289,443 B1 | * | 9/2001 | Scales et al. ............... | 708/300 |
| 6,327,704 B1 | * | 12/2001 | Mattson, Jr. et al. ....... | 717/153 |
| 6,343,375 B1 | * | 1/2002 | Gupta et al. ................. | 717/152 |
| 6,367,071 B1 | * | 4/2002 | Cao et al. .................... | 717/160 |
| 6,401,196 B1 | * | 6/2002 | Lee et al. .................... | 711/213 |

OTHER PUBLICATIONS

TITLE: Improving Instruction Level Parallelism by loop unrolling dynamic memory disambiguation, ACM, Davidson et al, Dec. 1995.*
TITLE: Combining Loop Transformation considering caching and scheduling, ACM, author: Wolf et al, 1996.*
TITLE: Unrolling Loops with indeterminate loop counts in system level pipelines, Guo et al, IEEE, 1998.*
TITLE: Symbolic range propagation, author: Blume et al, IEEE, 1995.*
"Advanced Compiler Design & Implementation" by Steven S. Muchnick, cover, table of contents and pp. 547–569, Copyright 1997.

* cited by examiner

Primary Examiner—Kakali Chaki
Assistant Examiner—Chameli C. Das
(74) Attorney, Agent, or Firm—Peter Lam

(57) ABSTRACT

A method of constructing and unrolling speculatively counted loops. The method of the present invention first locates a memory load instruction within the loop body of a loop. An advance load instruction is inserted into the preheader of the loop. The memory load instruction is replaced with a check instruction. The loop body is unrolled. A cleanup block is generated for said loop.

32 Claims, 4 Drawing Sheets

```
w = 4
store x = R2
t = q + s
z = x + w + u
R3 = load y
c = R3 + w
...
```

*FIG. 3A*

```
R3 = ld.a y
w = 4
store x = R2
t = q + s
z = x + w + u
chk.a R3
c = R3 + w
...
```

*FIG. 3B*

```
for i := 1 to 100 do {
    s := s + a[i]
}
```

*FIG. 2A*

```
for i := 1 by 2 to 99 do begin {
    s := s + a[i]
    s := s + a[i + 1]
end}
```

*FIG. 2B*

```
i = 0
Loop:
    Body(i)
    i = i + 1
    if (i < n) goto Loop
        else goto Exit
Exit:
```

FIG. 4A

```
i = 0
Loop:
    Body(i);
    i = i + 1
    if (i >= n) goto Exit
    Body(i + 1)
    i = i + 1
    if (i >= n) goto Exit
    Body (i + 2)
    i = i + 1
    if (i < n) goto Loop
        else goto Exit
Exit:
```

FIG. 4B

```
i = 0
t = ld.a n
if (t < 3) goto Recovery
Loop:
    Body(i)
    chk.a t, Recovery
    Body(i + 1)
    chk.a t, Recovery
    Body(i +2)
    i = i +3
    If (i < t-2) goto Loop
        else goto Recovery
Recovery:
    If (i >= n) goto Done
    Body(i)
    i = i +1
    If (i < n) goto Recovery
        else goto Done
Done:
```

FIG. 4C

METHOD OF CONSTRUCTING AND UNROLLING SPECULATIVELY COUNTED LOOPS

FIELD OF THE INVENTION

This invention relates to the field of computer software optimization. More particularly, the present invention relates to a method of constructing and unrolling speculatively counted loops. BACKGROUND OF THE INVENTION Computer programs are generally created as source code using high-level languages such as C, C++, Java, FORTRAN, or PASCAL. However, computers are not able to directly understand such languages and the computer programs have to be translated or compiled into a machine language that a computer can understand. The step of translating or compiling source code into object code process is performed by a compiler. Optimizations are mechanisms that provide the compiler with equivalent ways of generating code. Even though optimizations are not necessary in order. for a compiler to generate code correctly, object code may be optimized to execute faster than code generated by straight forward compiling algorithm if code improving transformations are used during code compilation. Loop unrolling is one such optimization that can be used in a compiler.

For the purpose of loop unrolling, loops are categorized as follows. A loop is counted if the number of iterations that the loop will execute is determined once execution reaches the loop. Counted loops are also referred to as "for" loops. Conversely, a loop has data dependent exit, loosely called a "while" loop, if the number of iterations is determined during the execution of the loop. Counted loops are further classified. If the compiler can determine the number of iterations that the loop will execute at compile time, then the number of iterations is a compile time constant. Otherwise, the number of loop iterations is variable.

A compiler can optimize counted loops better than "while" loops. Applying the counted loop optimization to a "while" loop will cause the compiler to generate incorrect code. Therefore, in order to ensure the generation of correct code, the compiler's default assumption must be that all loops are "while" loops. Then the compiler may later try to prove that a loop is a counted loop so that more optimizations become possible. Similarly, the compiler can optimize a compile time constant counted loop to execute more efficiently than a variable counted loop. Furthermore, applying compile time constant loop optimizations to a variable counted loop will generate incorrect code. The compiler's default assumption has to be that all loops are variable, and only if the compiler succeeds in proving that a counted loop is a compile time constant counted loop, can the compiler proceed to apply further optimizations.

For example, here are two possible optimizations that a compiler can apply only to compile time constant counted loops. In one possible optimization, the compiler may unroll the loop entirely. Typically, compilers will unroll a loop entirely if the trip count is determined to be small, e.g. eight or less. A second optimization that a compiler may apply to loops with large compile time constant trip counts is to chose an unrolling factor that divide the trip count evenly. If the loop is variable or if such an optimal factor can not be found (e.g. if the trip count is a large prime number), then a cleanup loop must be generated after the unrolled loop to execute the remainder of the iterations.

Compilers can also optimize counted loop to execute more efficiently than "while" loops. In the context of loop unrolling, when the compiler unrolls a "while" loop, the compiler has to simply copy the whole loop as many times as given by the unrolling factor chosen. This copy step includes the loop overhead. To illustrate, consider the following scheme:

```
LOOP:
   BODY(I)
   I=SOME_NEW_VALUE(I)
   If (CONDITION(I))
      GOTO LOOP
   ELSE
GOTO LOOP_END
LOOP_END:
```

BODY(I) is the useful part of the loop that does the real work in an iterative way. CONDITION is some test statement involving a variable "I" that changes in at least some of the loop iterations and that determines whether the loop terminates or continues execution. Unrolling this "while" loop by an unrolling factor of three yields the following construct:

```
LOOP:
   BODY(I)
   I=SOME_NEW_VALUE(I)
   If (NOT CONDITION(I))
      GOTO LOOP_EXIT
   BODY(I)
   I=SOME_NEW_VALUE(I)
   If (NOT CONDITION(I))
      GOTO LOOP_EXIT
   BODY(I)
   I=SOME_NEW_VALUE(I)
   IF (CONDITION(I))
      GOTO LOOP
   ELSE
      GOTO LOOP_EXIT
LOOP_EXIT:
```

When a compiler unrolls a counted loop, the compiler can save the loop overhead. The compiler can generate loop overhead code only once in each new iteration that corresponds to several original iterations. Consider the following counted loop construct:

```
I=0;
N=some_unknown_value;
LOOP:
   BODY(I)
   I=I+1
   If (I<N)
      GOTO LOOP
   ELSE
      GOTO LOOP_EXIT
LOOP_EXIT
```

Assume that the compiler decided to unroll this loop by an unrolling factor of three. The compiler has to generate code that will verify, at execution time, that the loop is about to execute at least three iterations. Also, the upper bound in the unrolled loop must now be reduced to N−2, and a cleanup loop must be generated to execute the remainder of the iterations. The resulting code will look like:

```
I=0
N=some_unknown_value
If (N<3) GOTO IN_BETWEEN
LOOP:
   BODY(I)
   BODY(I+1)
   BODY(I+2)
   If (I<N−2) GOTO LOOP
   ELSE GOTO IN_BETWEEN
```

```
IN_BETWEEN:
   IF (I>=N) GOTO LOOP_EXIT
CLEANUP:
   BODY(I)
   I=I+1
   IF(I<N)
      GOTO CLEANUP
   ELSE
      GOTO LOOP_EXIT
LOOP_EXIT
```
If the value of 'N' is large enough, most of the execution time will be spent in the unrolled loop. The added control around the loop has a negligible effect on performance. Significant performance is gained from not having to execute the loop overhead. Hence the compiler's ability to prove that a given loop is counted is a key in achieving this performance gain.

SUMMARY OF THE INVENTION

A method of constructing and unrolling speculatively counted loops is described. The method of the present invention first locates a memory load instruction within the loop body of a loop. An advance load instruction is inserted into the preheader of the: loop. The memory load instruction is replaced with an advanced load check instruction. The loop body is unrolled. A cleanup block is generated for said loop.

Other features and advantages of the present invention will be apparent from the accompanying drawings and from the detailed description that follow below.

BRIEF DESCRIPTION OF THE DRAWINGS

The present invention is illustrated by way of example and not limitations in the figures of the accompanying drawings, in which like references indicate similar elements, and in which:

FIG. 2A is an example 'for' loop before loop unrolling;

FIG. 2B shows the 'for' loop of FIG. 2A after the loop unrolling transformation;

FIG. 3A is a load-store pair in a code stream;

FIG. 3B shows the code of FIG. 3A after an advance load.;

FIG. 4A illustrates a loop before the loop unrolling transformation;

FIG. 4B illustrates the loop of FIG. 4A if unrolled by a factor of three as a 'while' loop;

FIG. 4C illustrates the loop of FIG. 4A unrolled three times as a speculatively counted loop.

DETAILED DESCRIPTION

Figure 1:
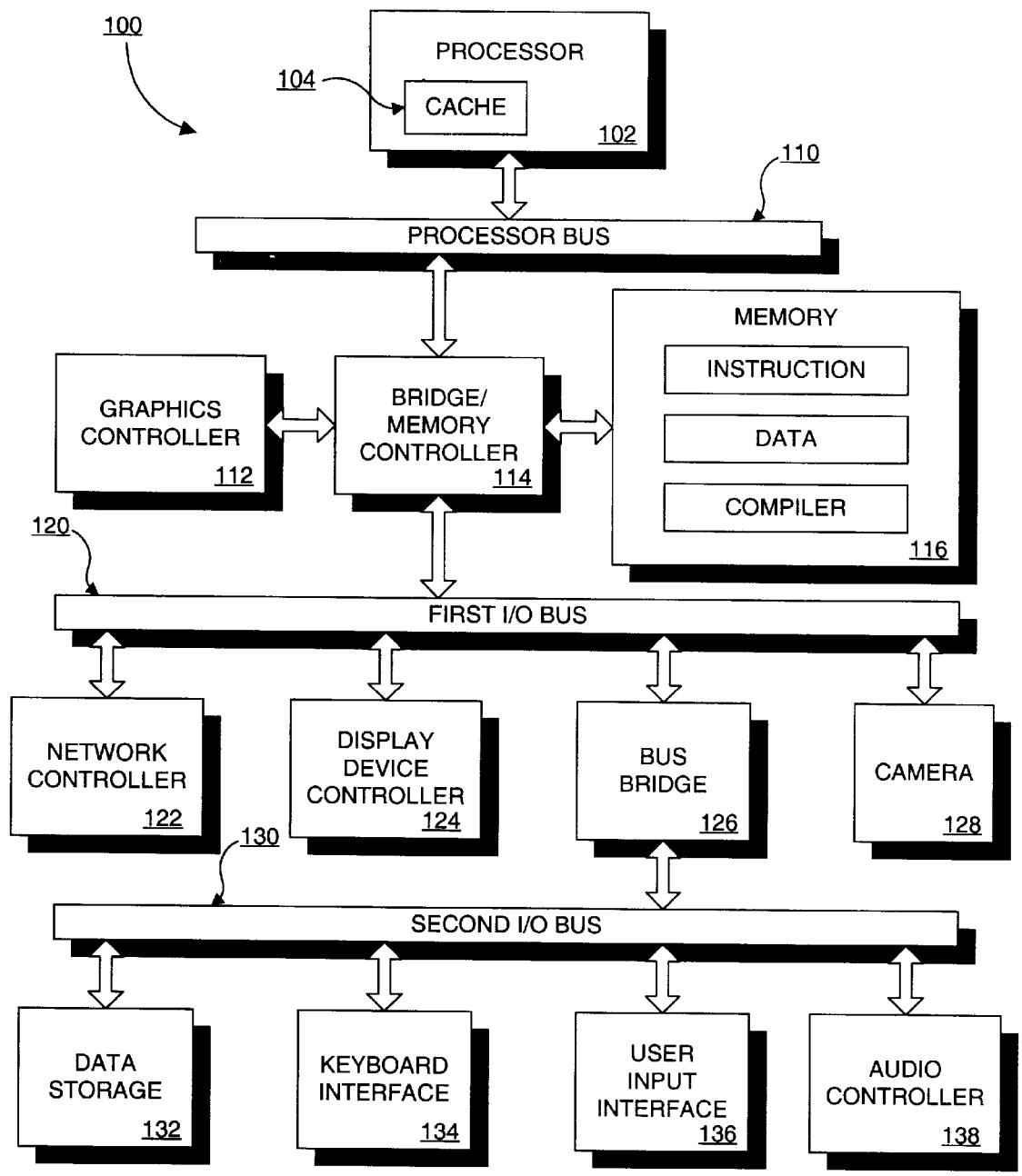
FIG. 1 is a block diagram illustrating a computer system which may utilize the present invention.

A method of constructing and unrolling speculatively counted loops is disclosed. Although the following embodiments are described with reference to C compilers, other embodiments are applicable to other types of programming languages that use compilers. The same techniques and teachings can easily be applied to other embodiments and other types of compiled object code.

The state of the art is proving that a loop is a counted loop includes the following steps. First, identify a variable, called an induction variable, that changes in every loop iteration. The amount of change, called the stride, is usually required to be additive and the same for each loop iteration. Then that same variable has to be compared to some other value, the upper bound, in a manner that controls whether the loop will terminate or continue to execute more iterations. Also, the second value in the comparison must be loop invariant. The upper bound can either be a compile time constant or stored in a memory location that can not change during the execution of the loop.

Note that the trip count, i.e. the number of iterations that the loop execute each time is given by "trip count=(upper bound—lower bound)/stride". If the upper bound, lower bound, and stride are all compile time constants, then so is the trip count. In cases where the upper bound is stored in a variable, the compiler has to prove that the variable cannot change during the execution of the loop. In order to prove that, the compiler has to verify that each operation in the loop that changes a value stored in some memory location, such as a store operation, is targeting a memory location that is different from the one used to store the value of the loop upper bound. The process by which the compiler determines whether two memory access operation refer to overlapping areas in memory or not is called memory disambiguation, and is undecidable.

The enhancement disclosed here is a new way to use the data speculative loads, also known as advanced loads. The advanced loads are meant to help the compiler promote the location of a load instruction beyond store instructions that are not disambiguated. The new usage of advanced loads described in this invention is more powerful in that it allows the compiler to change the way it optimizes a whole loop rather than simply change the location of a single load instruction. The present invention enables a compiler to optimize these loops as speculatively counted. Optimizing certain loops as speculatively counted may allow code performance almost as good if the loops were optimized as counted loops and better than if the loops were optimized as while loops. Thus this invention may allow a compiler with such a capability to have a performance advantage over compilers that do not have this technology. As a result, it is important for the code optimizations to be effective. Therefore, a method of constructing and unrolling speculatively counted loops would be desirable.

Embodiments of the present invention may be implemented in hardware or software, or a combination of both. However, embodiments of the invention may be implemented as computer programs executing on programmable systems comprising at least one processor, a data storage system including volatile and non-volatile memory and/or storage elements, at least one input device, and at least one output device. Program code may be applied to input data to perform the functions described herein and generate output information. The output information may be applied to one or more output devices. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language. The invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD) or other storage device) readable by a general or special purpose programmable processing system, for configuring and operating the processing system when the storage media or device is read by the processing system to perform the procedures described herein. Embodiments of the invention may also be considered to be implemented as a machine readable storage medium, configured for use with a processing system, where the storage medium so configured causes the processing system to operate in a specific and predefined manner to perform the function described herein.

There are two possible computer systems of interest. The first system is called a "host". The host includes a compiler. The host system carries out the transformation of constructing and unrolling speculatively counted loops. The second system is called a "target". The target system executes the programs that were compiled by the host system. The host and target systems can have the same configuration in some embodiments. In the compiled program, speculatively counted loops can be present. Such a program would use the data speculation that is implemented in system hardware. The target computer system has to be one in which the processor has data speculation implemented.

An example of one such processing system is shown in FIG. 1. Sample system 100 may be used, for example, to execute the processing for embodiments of a method of constructing and unrolling speculatively counted loops, in accordance with the present invention, such as the embodiment described herein. Sample system 100 is representative of processing systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 100 may be executing a version of the WINDOWS™ operating system available from Microsoft Corporation, although other operating systems and graphical user interfaces, for example, may also be used.

FIG. 1 is a block diagram of a system 100 of one embodiment of the present invention. System 100 can be a host or target machine. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented as a single processor system 100. However, it is understood that embodiments of the present invention may alternatively be implemented as systems having multiple processors. Processor 102 may be coupled to a processor bus 110 that transmits data signals between processor 102 and other components in the system 100.

System 100 includes a memory 116. Memory 116 may be a dynamic random access memory (DRAM) device, a static random access memory (SRAM) device, or other memory device. Memory 116 may store instructions and/or data represented by data signals that may be executed by processor 102. The instructions and/or data may comprise code for performing any and/or all of the techniques of the present invention. A compiler for constructing and unrolling speculatively counted loops can be residing in memory 116 during code compilation. Memory 116 may also contain additional software and/or data not shown. A cache memory 104 may reside inside processor 102 that stores data signals stored in memory 116. Cache memory 104 in this embodiment speeds up memory accesses by the processor by taking advantage of its locality of access. Alternatively, in another embodiment, the cache memory may reside external to the processor.

A bridge/memory controller 114 may be coupled to the processor bus 110 and memory 116. The bridge/memory controller 114 directs data signals between processor 102, memory 116, and other components in the system 100 and bridges the data signals between processor bus 110, memory 116, and a first input/output (I/O) bus 120. In some embodiments, the bridge/memory controller provides a graphics port for coupling to a graphics controller 112. In this embodiment, graphics controller 112 interfaces to a display device for displaying images rendered or otherwise processed by the graphics controller 112 to a user. The display device may comprise a television set, a computer monitor, a flat panel display, or other suitable display device.

First I/O bus 120 may comprise a single bus or a combination of multiple buses. First I/O bus 120 provides communication links between components in system 100. A network controller 122 may be coupled to the first I/O bus 120. The network controller links system 100 to a network that may include a plurality of processing system and supports communication among various systems. The network of processing systems may comprise a local area network (LAN), a wide area network (WAN), the Internet, or other network. A compiler for constructing and unrolling speculatively counted loops can be transferred from one computer to another system through a network. Similarly, compiled code that has been optimized by a method of constructing and unrolling speculatively counted loops can be transferred from a host machine to a target machine. In some embodiments, a display device controller 124 may be coupled to the first I/O bus 120. The display device controller 124 allows coupling of a display device to system 100 and acts as an interface between a display device and the system. The display device may comprise a television set, a computer monitor, a flat panel display, or other suitable display device. The display device receives data signals from processor 102 through display device controller 124 and displays information contained in the data signals to a user of system 100.

In some embodiments, camera 128 may be coupled to the first I/O bus to capture live events. Camera 128 may comprise a digital video camera having internal digital video capture hardware that translates a captured image into digital graphical data. The camera may comprise an analog video camera having digital video capture hardware external to the video camera for digitizing a captured image. Alternatively, camera 128 may comprise a digital still camera or an analog still camera coupled to image capture hardware. A second I/O bus 130 may comprise a single bus or a combination of multiple buses. The second I/O bus 130 provides communication links between components in system 100. A data storage device 132 may be coupled to second I/O bus 130. The data storage device 132 may comprise a hard disk drive, a floppy disk drive, a CD-ROM device, a flash memory device, or. other mass storage device. Data storage device 132 may comprise one or a plurality of the described data storage devices. The data storage device 132 of a host machine can store a compiler for constructing and unrolling speculatively counted loops. Similarly, a target machine can store code that has been optimized by with a method for constructing and unrolling speculatively counted loops can be stored in data storage device 132.

A keyboard interface 134 may be coupled to the second I/O bus 130. Keyboard interface 134 may comprise a keyboard controller or other keyboard interface device. Keyboard interface 134 may comprise a dedicated device or may reside in another device such as a bus controller or other controller device. Keyboard interface 134 allows coupling of a keyboard to system 100 and transmits data signals from a keyboard to system 100. A user input interface 136 may be couple to the second I/O bus 130. The user input interface may be coupled to a user input device, such as a mouse, joystick, or trackball, for example, to provide input data to the computer system.

Audio controller 138 may be coupled to the second I/O bus 130. Audio controller 138 operates to coordinate the recording and playback of audio signals. A bus bridge 126 operates to coordinate the recording and playback of audio signals. A bus bridge 126. couples first I/O bus 120 to second I/O bus 130. The bus bridge 126 operates to buffer and bridge data signals between the first I/O bus 120 and the second I/O bus 130.

Embodiments of the present invention are related to the use of the system 100 for constructing and unrolling speculatively counted loops. According to one embodiment, such processing may be performed by the system 100 in response to processor 102 executing sequences of instructions in memory 116. Such instructions may be read into memory 116 from another computer-readable medium, such as data storage device 132, or from another source via the network controller 122, for example. Execution of the sequences of instructions causes processor 102 to construct and unroll speculatively counted loops according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 100 perform their conventional functions well-known in the art. In particular, data storage device 132 may be used to provide long-term storage for the executable instructions and data structures for embodiments of methods of constructing and unrolling speculatively counted loops in accordance with the present invention, whereas memory 116 is used to store on a shorter term basis the executable instructions of embodiments of the methods of constructing and unrolling speculatively counted loops in accordance with the present invention during execution by processor 102.

Although the above example describes the-distribution of computer code via a data storage device, program code may be distributed by way of other computer readable mediums. For instance, a computer program may be distributed through a computer readable medium such as a floppy disk, a CD ROM, a carrier wave, a network, or even a transmission over the internet. Software code compilers often use optimizations during the code compilation process in an attempt to generate faster and better code. Loop unrolling is one optimization that may be applied when code is compiled. An example of a typical loop may be:

Loop{...
    B(i)
    i=i+1
    test(i)
    exit
    ...}

There is normally some control overhead such as 'test(i)' in the above example to control the number of loop iterations. In loop unrolling, the loop body is copied multiple times. The above loop may be unrolled to become:

Loop{...
    B(i)
    B(i+1)
    B(i+2)
    B(i+3)
    i=i+4
    test (i)
    exit ... }

The original loop body B(i) has been copied three times and the control variable 'i' incremented accordingly. By unrolling the loop, the branch instruction and test for loop exit executes three times less than in the original loop. Furthermore, fewer instructions are needed for the control flow and more instructions are grouped together into a block. A large contiguous block of code may also allow for subsequent code optimizations.

Loop unrolling reduces the overhead of executing an indexed loop and may improve the effectiveness of other optimizations, such as common subexpression elimination, induction-variable optimizations, instruction scheduling, and software pipelining. Loop unrolling generally increases the available instruction-level parallelism, especially if several other transformations are performed on the copies of the loop body to remove unnecessary dependencies. Thus, unrolling has the potential of significant benefit for many implementations and particularly for superscalar and VLIW ones and Explicitly Parallel Instruction Computing (EPIC).

Loop unrolling may also provide other advantages. For instance, instruction scheduling or prefetching in some computer architectures may benefit from loop unrolling. Loop unrolling is often used to enable the generation of data prefetch instructions. When a compiler inserts. data prefetch instructions into loops, the compiler may need to insert those instructions into only some iterations of the loop. Unrolling the loop makes several iterations explicitly available to the compiler such that the compiler can insert instructions to some and not all of iterations. In some instances, unrolled loops may utilize cache memory more efficiently. Furthermore, not taken branches may be cheaper in terms of performance loss than taken branches. If the compiler predicts that the loop will execute many iterations, then a larger block of code may be cached in memory and fewer jumps or branches will be executed.

When the compiler is analyzing the program code, a loop may be completely removed and replaced with a contiguous block of code if the number of loop iterations is small. Similarly, the number of loop iterations may be reduced through loop unrolling if the number of iterations is large.

Referring now to FIGS. 2A and 2B, there are two examples of 'for' loops. FIG. 2A illustrates a normal 'for' loop before unrolling. FIG. 2B illustrates the 'for' loop of FIG. 2A after the loop unrolling transformation. The unrolling transformation in this example has been oversimplified. For this example, the loop bounds are known constants and the unrolling factor divides evenly into the number of iterations. However, such conditions are generally not satisfied and the compiler has to keep a cleanup copy of the loop. When the number of iterations remaining in a loop is less than the unrolling factor, the unrolled copy is exited and the cleanup copy is executed to complete the remaining iterations. This approach also reduces the number of early termination tests and conditional control flow between copies of the body in some loops.

When the compiler unrolled the loop of FIG. 2A by a factor of two, the loop body "s:=s+a[i]" was copied twice and the loop counter 'i' adjusted as shown in FIG. 2B. The unrolled loop executes both the loop-closing test and the branch half as many times as the original loop. Hence loop unrolling optimization may positively affect system performance. In the present example, loop unrolling increases the effectiveness of instruction scheduling by making two loads of 'a[i]' values available to be scheduled in each loop iteration.

Loops are generally distinguished into two classifications: counted loops and loops with a data dependent exit. A loop is counted if the number of iterations that the loop will execute is determined once execution reaches the loop. However, if the number of loop iterations is not determined once execution reaches the loop, and is determined during the execution of the loop, then the loop will be classified as a while loop. The number of iterations that a while loop executes may be determined during the execution of the loop or on the fly.

Counted loops are further distinguished between two kinds. The first kind of loop has a constant number of iterations known at compile time. For example, the header of a loop may be "for (i=0; i<200; i++)". The compiler will be able to determine that the number of loop iterations will be two hundred. The loop may be unrolled, but the loop body may not necessarily be copied two hundred times. Instead, the unrolling factor may be a smaller number that divides into two hundred. The loop body may be copied ten times and the new loop executed twenty times. In one embodiment, the loop unrolling factor is chosen such that the loop count is divided evenly.

The second type of counted loop is variable. The point of a variable counted loop is that the compiler cannot determine the number of loop iterations. The inability to determine the number of iterations can be due to a variety of reasons. One example of the inability of a compiler to determine the number of iterations in compile time is the case where the value of loop iterations is read by the program from an input file. A function call is typically such a barrier to analysis. Compilers do perform inter function analysis. Conversely, a function call is not the only reason why a compiler is unable to figure out the number of loop iterations.

In a variable counted loop, the number of loop iterations can be the result of a function call. The function call provides a number to be used as the loop upper bound. As a result, the compiler will not know at compile time how many times the loop will execute since the loop count may be different each time the loop is executed. So even though the loop is a counted loop, the trip count is unknown or not a compile time constant.

In addition to counted loops and "while" loops, a third class of loops is introduced. This third class comprises speculatively counted loops. A speculatively counted loop satisfies all the requirements of a counted loop except for the characteristic that a speculatively counted loop has a loop upper bound that has not been proven to be loop invariant. Without the ability to classify loops as speculatively counted, these loops would have to be considered "while" loops. The compiler can transform a "while" loop into a speculatively counted loop by: (1) inserting an advanced load of the upper bound into a register; and (2) inserting an advanced load check before the loop termination test. Various optimizations such as software pipelining, whose effectiveness depends on classification of loops, may benefit from being able to transform "while" loops into speculatively counted loops, the following embodiments only demonstrate the way the loop unrolling optimization benefits from this capability. The description of speculatively counted loops and methods of constructing speculatively counted loops are presented within the context of loop unrolling.

Knowledge that a loop is a counted loop allows the compiler the opportunity to further is optimize the loop in ways that may not be available otherwise. One such optimization may be loop unrolling where a loop is unrolled 'n' times, such that 'n–1' additional copies of the loop body are made. When the unrolled loop is a counted loop, there is no need to test for the exit condition inside the unrolled body. But if the loop is a data dependent or while loop, then the exit condition needs be tested after each loop body. Because the exit condition is tested once during each iteration of the counted loop, 'n–1' tests are saved per each iteration.

In order to classify a loop as a counted loop, the compiler has to prove a number of conditions. These conditions may include identifying characteristics such as a linear induction variable and a loop invariant variable that serves as an upper bound for the loop in particular. If the compiler cannot prove that the upper bound is loop invariant, then the loop cannot be classified as a counted loop. One of the most common limitations to proving that a variable is loop invariant is showing that no memory location stores that executes inside the loop body can change the value of the loop upper bound.

Unrolling a data dependent loop such as the following while loop may be generate less efficient code. while (a[i] !=0) do { . . . B(i) . . . }

The compiler first copies the loop body a number of times. In this example, the compiler is designed to unroll all loops by a factor of four. Next, the compiler has to insert multiple exit tests to check for termination between every loop body. Similarly, if the loop had a variant upper bound, test statements would be needed to ensure that the upper bound had not changed.

Loop { . . .
  B(i)
  if (a[i]=0) goto Exit
  B(i+1)
  if (a[i+1]=0) goto Exit
  B(i+2)
  if (a[i+2]=0) goto Exit
  B(i+3)
  if (a[i+3]=0) goto Exit
  else goto Loop
Exit . . . }

On the other hand, some counted loops may need the exit condition tested only once. In a counted loop, the original loop body is simply replaced with four copies of the loop body.

But unrolling a loop having an indeterminate number of iterations is more complicated. The compiler may attempt to unroll the loop even though the value of the loop count 'n' is unknown. If 'n' turns out to be two and the compiler had copied the loop four times, then the program code will be wrong since the loop will be executed four times before the exit condition is tested. Another issue in loop unrolling is that the trip count may not be evenly divisible. For instance, there may be no way to evenly divide a trip count of seventeen or nineteen. As a result, a clean up loop simply comprising the original loop with one loop body may be inserted after the unrolled loop. In the example loop having a trip count of seventeen, the processor may execute the unrolled loop with the four copies four times and the cleanup loop once for a total of seventeen iterations.

Some important issues in loop unrolling are deciding which loops to unroll and by what to factor. The concerns involved are architectural characteristics and the selection of particular loops in a particular program to unroll and the unrolling factors to use for them. Architectural characteristics include factors such as the number of registers available, the available overlap among floating-point operations and memory references, and the size and organization of the instruction cache. The impact of some architectural characteristics is often determined heuristically by experimentation. As a result, unrolling decisions for individual loops can benefit significantly based on feedback from profiled runs of the program.

The results of such experimentation may also depend on the presence of the following loop characteristics: (1) the presence of only a single basic block or straight-line code; (2) a balance of floating-point and memory operations or a certain balance of integer memory operations; (3) small number of intermediate-code instructions; and (4) loops having simple loop control. The first and second criteria restrict loop unrolling to loops that are most likely to benefit from instruction scheduling. The third characteristic attempts to keep the unrolled blocks of code short so that cache performance is not adversely impacted. The last criterion keeps the compiler from unrolling loops for which it is difficult to determine when to take the early exit to the unrolled copy for the final iterations, such as when traversing a linked list. In one embodiment of the invention, the unrolling factor may be anywhere from two on up, depending on the specific contents of the loop body. Furthermore, the unrolling factor of one embodiment will usually not be more than four and almost never more than eight. However, further development of VLIW or EPIC machines may provide good use for larger unrolling factors.

In one embodiment, the number of copies made of the loop body is determined heuristically. In another embodiment, the compiler may provide the programmer with a compiler option to specify which loops to unroll and what factors to unroll them by. A performance tradeoff exists depending on how many times the loop body is copied. One factor involved is the size of the instruction cache. Code performance may be impacted if a loop body is copied too many times since the block of new code may not fit into the instruction cache. A programmer may want to grow the number of instructions in a loop body so that the computer has a larger contiguous block of code to execute. However, the body of instructions should fit into the instruction cache or else a performance hit may occur. Hence, the programmer may start initially with a loop that originally fits in the instruction cache, but end up with a large block of instructions that no longer fits into the cache.

In the present invention, a new classification of loops called speculatively counted loops is created. Speculatively counted loops have generally been classified as data dependent exit loops and hence, not optimized as a counted loop. Speculatively counted loops have a construct similar to that of counted loops, but some speculatively counted loops may have stores to memory that cannot be disambiguated from the loop upper bound. Hence, the reason the compiler did not classify the loop as a counted loop was because the loop upper bound could not be disambiguated. One example where the compiler cannot prove that the upper bound is loop invariant is in a loop involving pointers to arrays. A speculatively counted loop would have been classified as a counted loop if the loop upper bound had been disambiguated from all memory stores in the loop. Hence, the reason the compiler did not classify the loop as a counted loop was because the loop upper bound could not be disambiguated. In one embodiment, the process of classifying a loop as speculatively counted is performed in a procedure that is similar to the process used to classify loops as a counted loop.

Another problem encountered with loop unrolling is that the value of the trip count 'n' cannot change within the loop. Proving that the trip count is constant may be a difficult task for some compilers. For example, the program may have a pointer that points to an integer value. Depending on the program language, a pointer may generally be assigned a value anywhere within the program, including somewhere inside a loop. Furthermore, pointers may be dynamic and array lengths may change. If the compiler is unable to prove that none of the memory stores inside the loop change the value of 'n,' then the processor may not execute four iterations of the loop body consecutively without testing for loop termination between each body. For example, a loop may look like:

```
n=10
p=address n
for (i=0; i<n; i++) { . . .
  x=y+z
  *p=4
. . . }
```

The header of the above loop is "for (i=0; i<n; i++)," where the loop count 'n' may be a variable dynamically defined by a function call or 'n' may be referenced by a pointer '*p' or modified within the loop body. The ambiguity introduced by pointer *p prevents loop optimization in conventional compilers. Since the upper bound 'n' is not known at compile time or may change within the loop, the compiler will consider the loop as having an unknown upper bound. Hence the loop would be treated like a while loop. The present invention may allow for the transformation of loops that look like counted loops, but have loop upper bounds that cannot be proven as loop invariant.

A statement in a computer program is said to define a variable if it assigns, or may assign. a value to that variable. For example, the statement "x=y+z" is said to define 'x'. A statement that defines a variable contains a definition of that variable. In this context there are two types of variable definitions: unambiguous definitions and ambiguous definitions. Ambiguous definitions may also be called complex definitions. When a definition always defines the same variable, the definition is said to be an unambiguous definition of that variable. For example, the statement, "x=y" always assigns the value of 'y' to 'x'. Such a statement always defines the variable 'x' with the value of 'y'. Thus, the statement "x=y" is an unambiguous definition of 'x'. If all definitions of a variable in a particular segment of code are unambiguous definitions, then the variable is known as an unambiguous variable.

Some definitions do not always define the same variable and may possibly define different variable at different times in a computer program. Thus they are called ambiguous definitions. There are many types of ambiguous definitions. One type of ambiguous definition occurs where a pointer refers to a variable. For example, the statement "*p=y" may be a definition of 'x' since it is possible that the pointer 'p' points to 'x'. Hence, the above ambiguous definition may ambiguously define any variable 'x' if it is possible that 'p' points to 'x'. In other words, '*p' may define one of several variables depending on the addressed value of 'p'. Another type of ambiguous definition is a call of a procedure with a variable passed by reference. When a variable is passed by reference, the address of the variable is passed to the proccdure. Passing a variable by reference to a procedure allows the procedure to modify the variable. Alternatively, variables may be passed by value. Only the value of the variable is passed to the procedure when a variable is passed by value. Passing a variable by value does not allow the procedure to modify the variable. Another type of ambiguous definition is a procedure that may access a variable because that variable is within the scope of the procedure. Yet another type of ambiguous definition occurs when a variable is not within the scope of a procedure but the variable has been identified with another variable that is passed as a parameter or is within the scope of the procedure.

When the compiler unrolls a loop having a data dependent exit, the compiler makes copies of the loop body 'i' and the exit test. The exit test allows the processor to take side exits out of the loop during program execution. Data dependent exit loops are generally tested for loop termination between each copy of the body. If the loop has to terminate, then the processor has to go to a loop exit. If the exit condition tests true, then the loop has to terminate and the program goes to a loop exit. If the condition is false, then the next loop body 'i+1' is executed and the test for loop termination performed again.

One advantage of the present invention may be the omission of the exit condition test between copies of the loop body. However, the compiler needs to determine whether the speculatively counted loop may be correctly treated as a counted loop. If the compiler cannot make such a determination, then the tests for loop termination and side exits are kept in the loop. One criteria in determining if a speculatively counted loop may be treated like a counted loop is whether the loop upper bound is loop invariant. In order to prove that the upper bound is truly loop invariant, the compiler needs to analyze the stores that occur inside the loop. The process of proving that two memory operands are different is called memory disambiguation.

Data speculation occurs when a later load is scheduled above an earlier store and the compiler cannot verify that the load and store will never access overlapping areas of memory. The process of determining whether loads and stores access overlapping areas of memory is termed "disambiguation." A load-store pair for which the compiler cannot guarantee that the load and store will never access overlapping areas of memory are termed "un-disambiguated." In the following text, the phrase "un-disambiguated store" will be used to refer to the store in an un-disambiguated load-store pair. A store cannot be un-disambiguated by itself, but only in the context of a particular load.

Compilers often perform memory disambiguation to prove that a loop upper bound is loop invariant. Sometimes, two memory operands may appear to be different, but the compiler is unable to verify that the two operands are indeed different. Memory disambiguation attempts to verify that two variables are not the same and are not affected by changes to the other. In one embodiment, the processor may include a special construct to assist compilers in the task of memory disambiguation. One special construct for memory disambiguation is the advance load or data speculative load. For example, a program has stored a piece of data at memory location X. At some later point in the program, a piece of data is loaded from memory location Y. If the compiler tries to schedule the memory load before the memory store, the resulting program is legal only if locations X and Y are different memory locations. If the compiler can prove that memory locations X and Y are indeed different, then the compiler can switch the order of the store and load instructions. But if locations X and Y are the same memory location and the order of the store and load instructions are switched, then the memory load would be fetching the wrong data since the correct data has not yet been stored at the memory location. If the variable that stores the loop upper bound cannot be disambiguated from all the memory stores in the loop, then that value has to be read/reloaded from memory prior to each comparison, ad the loop cannot be treated as a counted loop.

The compiler may use the advance load construct in situations where the compiler cannot verify that the memory locations are different. The present invention may be used with counted loops that have upper bounds that cannot be disambiguated from memory stores within the loop body. One example may be a loop that contains a pointer into a large array. The compiler may not be able to verify that the pointer does change loop upper bound. In one embodiment, the advance load (ld.a) and advance load check (chk.a) instructions interact with a hardware structure called the advanced load address table (ALAT). The advanced load instruction causes the processor to perform a load from a memory location and write the memory address into an ALAT. The ALAT acts as a cache of the physical memory address and the physical register address accessed by the most recently executed advanced loads. The size and configuration of the ALAT is implementation dependent. A straightforward implementation of one embodiment may have entries containing a physical memory address field, an access size field, a register address field, and a register type field (general or floating-point). Using the target register address and type as an index, advanced loads allocate a new entry in the ALAT containing the physical address and size of the region of memory being read.

During each memory store, the processor scans the ALAT for any entries having the same memory address. Store instructions would cause the processor to search all entries in the ALAT using the physical address and size of the region of memory being written. All entries corresponding to overlapping regions of memory are invalidated. Advanced load checks access the ALAT using the target register address and type as an index. If the corresponding ALAT entry is not valid, then either a store subsequent to the advanced load accessed an overlapping area of memory or the advanced load's entry has been replaced. The advanced load check then performs the normal load operation for memory access corresponding to the invalid ALAT entry. But if the ALAT entry accessed by the advanced load check is valid, then the advanced load had received correct data and the advanced load check performs no action.

One embodiment uses "advanced loads" or "data speculative loads" to handle un-disambiguated memory load-store pairs. Support for data speculation may take the form of the advance load (ld.a) and advance load check (chk.a) instructions. A memory load that is statically scheduled above an earlier store when the pair are un-disambiguated is converted into an advanced load. However, if the load-store pair can be disambiguated then the load does not need to be converted into an advanced load. When the compiler converts a particular load into an advanced load, a corresponding advanced load check is scheduled at a point below the lowest un-disambiguated store in the originating basic block of the advanced load. Thus the advanced load and advanced load check instructions bracket one or more un-disambiguated stores. The advanced load check should be configured to perform the same memory access in both address and size, and write the same destination register as the advanced load.

The advance load check constructs is related to the advance load. In one embodiment, the compiler will insert an advanced load check instruction between copies of the loop body in the unrolled loop. The advanced load check statement may be inserted just prior to the statement that uses the advance loaded data. The advanced load check instruction directs the processor to check the ALAT for a specific memory address. The advanced load check instruction checks to see if the advance loaded data has been modified by a memory store. If the data has been changed, then the data has to be reloaded. In one embodiment, a failed check indicates that the data advance loaded from the given memory location has been superseded with more recently stored data. If the desired memory address is missing from the ALAT or if the entry has been invalidated, then the check has failed and a memory load needs to be execute again for the specified memory location. In either situations of the missing ALAT entry or invalidated ALAT entry, a new memory load is performed so that the instruction requesting the desired data will be using the correct result. Hence by using the advanced load and advanced load check constructs in a program, the compiler can change the order of the loads and stores without causing the program to function incorrectly.

Referring to FIGS. 3A and 3B, use of the advance load and advanced load check are illustrated. FIG. 3A illustrates a load-store pair in a code stream. The "store x=R2" instruction represents a memory store of the contents of register 'R2' to memory operand 'x'. The "R3 load y" instruction represents a memory load of memory operand 'y' to register 'R3'. FIG. 3B illustrates the code after an advance load. In FIG. 3A, the "R3=load y" instruction may be moved above the "store x=R2" only if memory operands 'y' and 'x' are different. Otherwise, the move would be illegal. The advanced load check (chk.a) is used when a memory load is move earlier in the instruction stream for advance loading. The memory load of FIG. 3A has been moved earlier in the instruction stream and modified to become an advance load as illustrated by "R3=ld.a y" in FIG. 3B. Correspondingly, a advanced load check "chk.a R3" has been inserted at the original location of the memory load and just prior the use of register 'R3'. If the advance loaded value of register 'R3' from memory operand 'y' has been modified before the advanced load check, then memory load needs to occur again in order to correct the changes. If instructions that are data dependent upon the advanced load are not scheduled above an un-disambiguated store, then only the memory load instruction needs to be re-executed in the event of an overlap between the advanced load and a memory store. This operation is the function of the advanced load check. However, if one or more instructions dependent upon the advance load are scheduled above an un-disambiguated store, then in the event of an overlap all of these rescheduled instructions need to be re-executed in addition to the memory load.

The chk.a instruction is used to determine whether certain instructions needed to be re-executed. The compiler can use the advance load check (chk.a) if other instructions are also moved before the memory store. The advance load check branches the execution to another address for recovery if the check fails. The advance load check (chk.a) instruction of one embodiment has two operands. One operand is the register containing the data loaded by advance load. The second operand is the address of the recovery block. The recovery block can be simple and just branch to the cleanup loop in one embodiment. If the chk.a cannot find a valid ALAT entry for the advance load, then the program branches to a recovery routine in an attempt to fix any mistakes made by using the wrongly loaded data. The chk.a instruction specifies a target register that needs to have the same address and type as the corresponding advanced load. In the event of an invalid entry in the ALAT, program control is transferred to a recovery block. The recover block contains code that comprises a copy of the advanced load in non-speculative form and all of the dependent instructions prior to the chk.a. After completion of the recovery code, the program resumes normal execution. However, the point at which normal execution is not predefined. The recovery block has to end with a branch instruction to redirect execution at a continuation point in the main thread of execution. One goal of the recovery block is to maintain program correctness. If a memory store in the loop body is changing the value of the upper bound, the recovery block or cleanup loop may also revert the loop back to its original form and simply iterates one loop body at a time.

The present invention discloses a method to optimize a speculatively counted loop. Unrolling speculatively counted loops is similar to unrolling counted and while loops. When a speculatively counted loop is unrolled, the loop body is copied 'n−1' times. The compiler also adds a statement into the preheader of the loop to perform a data speculative load of the loop upper bound from memory into a register. In another embodiment, the statement may be inserted at a point that is outside of the loop. The data speculative load is also referred to as an advanced load. Then between every two loop bodies in the unrolled loop, the compiler inserts a speculation check instruction. The check instruction of one embodiment is an advance load check. The speculation check is related to the advanced load that was added to the preheader. A speculation check determines whether the memory location that was speculatively loaded has been changed by a subsequent store to memory. If the speculatively loaded memory located has been changed, then control is transferred to the recovery block.

FIGS. 4A, 4B, and 4C illustrate three different versions of a loop. FIG. 4A illustrates the loop before the loop unrolling transformation. FIG. 4B illustrates the loop of FIG. 4A if unrolled by a factor of three as a 'while' loop. FIG. 4C illustrates the loop of FIG. 4A unrolled three times as a speculatively counted loop. The loop counter or control of all three versions is represented by 'i' and the termination count is represented by 'n'.

In one embodiment, the compiler may use the advance load and advanced load check constructs in a program loop if the only instruction relevant to the contents of a memory address moved before the memory store is the memory load. The compiler starts by generating an advance load of the upper bound. The loop body may then be copied and the count incremented accordingly. But instead of testing between each loop body for loop termination as in a while loop, the compiler generate an advanced load check that corresponds to the target of the advance load. The compiler also appends a cleanup loop having a single loop body to the unrolled loop. A failed check would cause a recovery and memory load to be performed so that the program execution could continue correctly. Furthermore, the compiler may also take certain instructions that use the value that was advance loaded, such as an add instruction, and move those instructions before the memory store in the code. The method of constructing and unrolling speculatively counted loops does not have to keep track of any specific store that cannot be disambiguated from the load of an upper bound. Once the load of the upper bound is not proven to to be loop invariant, there is no longer a need to keep track of a specific store. There may be any number of such stores. However, if the advanced load check fails, then the moved instructions may have to be re-executed again after the correct data is loaded in order to maintain program correctness.

The function of the advanced load check in one embodiment includes branching to a recovery block if the check fails. During the loop unrolling transformation of one embodiment, the compiler can generate code for the recovery block that will re-execute all the instructions that were moved in front of the memory store. The recovery block of one embodiment may also branch to a cleanup loop. Once the processor completes the recovery, the program may direct the processor to branch from the end of the recovery block to back a point in the program after the originating advanced load check. The processor can then continue program execution as before the check failed. Hence if the advanced load check does not fail, the overhead is negligible and the program may execute quickly. The compiler can generate a recovery block by saving a copy of the original loop. The recovery block contains code to perform a new load of the memory location into a register and to transfer loop control to a version of the loop that is identical to the original version of the loop. The speculation check instruction and the recovery block are measures to ensure correct loop execution. In one embodiment, the recovery block is not part of the actual loop and the check instruction is comprised of one instruction. Hence, the performance of an unrolled speculatively counted loop may approach that of code generated for an unrolled counted loop.

Figure 5:
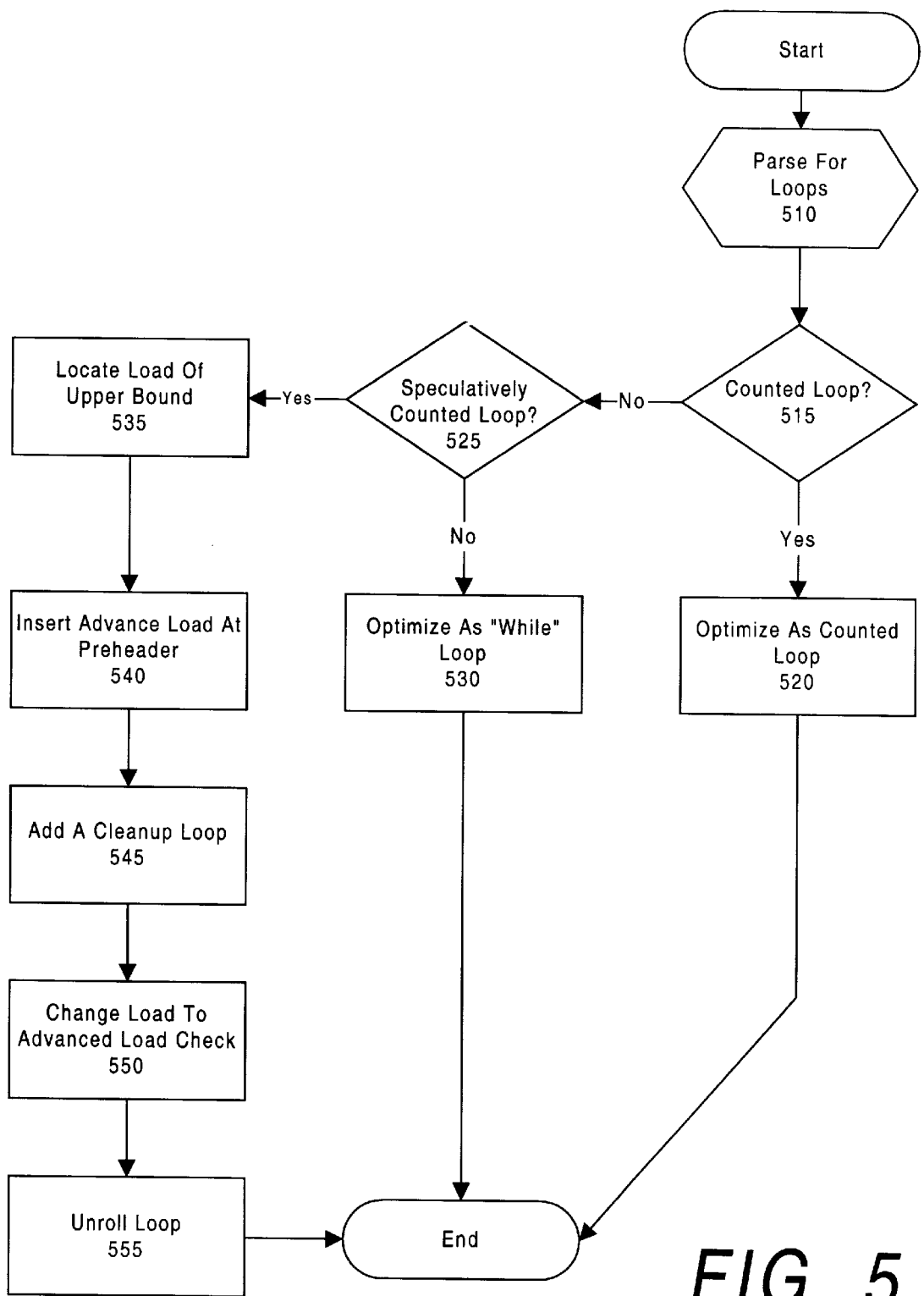
FIG. 5 is a flow diagram that illustrates steps for constructing and unrolling. speculatively counted loops in one embodiment of the present invention.

FIG. 5 is a flow diagram that illustrates steps for constructing and unrolling speculatively counted loops in one embodiment of the present invention. Software developers may often decide to optimize computer programs in attempt to improve performance. One such code optimization method may entail the steps as shown in FIG. 5. The compiler parses the program code for loops at step 510. When a loop is encountered at step 515, the compiler determines whether the loop is a counted loop. If the loop is a counted loop, then the compiler attempts to optimize the loop as a counted loop at step 520. If the loop is found not to be a counted loop, the compiler goes on to step 525 to determine whether the loop is a speculatively counted loop. If the loop is found not to be a speculatively counted loop, the compiler attempts to optimize the loop as a non-speculatively counted or "while" loop at step 530. When the compiler has determined that a speculatively counted loop is present, load instructions of upper bounds are located within the loop at step 535. Advance loads are inserted at the loop preheader at step 540. At step 545, the compiler generates and adds a cleanup loop. The cleanup block and recovery block in one embodiment may be identical or simply point to the other block of code. Memory load instructions are changed to advanced load check instructions at step 550. The original loop body is unrolled at step 555. The unrolling factor of one embodiment is determined heuristically. In another embodiment, the unrolling factor may be user specified or predetermined.

In the foregoing specification, the invention has been described with reference to specific exemplary embodiments thereof. For purposes of explanation, specific numbers, systems and configurations were set forth in order to provide a thorough understanding of the present invention. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method of constructing an unrolled loop comprising:
    identifying a speculatively counted loop, wherein said speculatively counted loop includes a loop upper bound that has not been proven to be loop invariant;
    locating a memory load instruction within loop body of said speculatively counted loop;
    inserting an advance load instruction into a preheader of said speculatively counted loop;
    replacing said memory load with an advanced load check instruction; unrolling said loop body of said speculatively counted loop; and
    generating a cleanup block for said speculatively counted loop.

2. The method of claim 1 further comprising converting a while loop into a speculatively counted loop.

3. The method of claim 1 wherein said loop body is unrolled by a predetermined unrolling factor.

4. The method of claim 1 further comprising moving instructions located within said loop from a first location after a memory store instruction to a second location before said memory store instruction in said loop.

5. The method of claim 1 wherein said cleanup block comprises a rolled copy of original loop body.

6. The method of claim 1 further comprising removing termination tests from between unrolled loop bodies.

7. The method of claim 1 further comprising generating a recovery block for said loop.

8. The method of claim 1 wherein said cleanup block is a recovery block.

9. A method of optimizing program performance comprising:
    identifying a loop, said loop having a memory. load that cannot be disambiguated from a loop upper bound wherein said loop upper bound has not been proven to be loop invariant;
    locating a memory load instruction for said memory load within loop body of said loop;
    inserting an advance load instruction in preheader of said loop;
    replacing said memory load instruction with an advanced load check instruction;
    unrolling said loop body; and
    generating a cleanup block.

10. The method of claim 9 wherein said loop is a speculatively counted loop.

11. The method of claim 9 wherein said loop is a data dependent while loop.

12. The method of claim 9 wherein said loop body is unrolled by a predetermined unrolling factor.

13. The method of claim 9 further comprising converting a while loop into a speculatively counted loop.

14. The method of claim 9 further comprising moving instructions located within said loop from a first location after a memory store instruction to a second location before said memory store instruction in said loop.

15. The method of claim 9 wherein said cleanup block comprises a rolled copy of original loop body.

16. The method of claim 9 further comprising removing termination tests from between unrolled loop bodies.

17. The method of claim 9 further comprising generating a recovery block for said loop.

18. The method of claim 9 wherein said cleanup block is a recovery block.

19. A computer readable medium having embodied thereon a computer program, the computer program being executable by a machine to perform:

identifying a loop, wherein said loop includes a memory load that cannot be disambiguated from a loop upper bound;

locating a memory load instruction within loop body of said loop;

inserting an advance load instruction in preheader of said loop;

replacing said memory load instruction with an advanced load check instruction;

unrolling said loop body; and generating a cleanup block.

20. The computer readable medium having embodied thereon a computer program in claim 19 wherein said loop is a speculatively counted loop.

21. The computer program being executable by a machine in claim 19 to further perform moving instructions located within a loop from a first location after a memory store instruction to a second location before said memory store instruction in said loop.

22. The computer readable medium having embodied thereon a computer program in claim 19 wherein said cleanup block comprises a rolled copy of original loop body.

23. The computer program being executable by a machine in claim 19 to further perform removing termination tests from between unrolled loop bodies.

24. The computer program being executable by a machine in claim 19 to further perform generating a recovery block for said loop.

25. The computer readable medium having embodied thereon a computer program in claim 19 wherein said cleanup block is a recovery block.

26. A digital processing system having a processor operable to perform:

identifying a loop, said loop having a loop upper bound not proven to be loop invariant;

locating a memory load instruction within loop body of said loop;

inserting an advance load instruction in preheader of said loop;

replacing said memory load instruction with an advanced load check instruction;

unrolling said loop body; and generating a cleanup block.

27. The digital processing system of claim 26 wherein said loop is a speculatively counted loop.

28. The digital processing system of claim 26 to further perform moving instructions located within said loop from a first location after a memory store instruction to a second location before said memory store instruction in said loop.

29. The digital processing system of claim 26 wherein said cleanup block comprises a rolled copy of original loop body.

30. The digital processing system of claim 26 to further perform removing termination tests from between unrolled loop bodies.

31. The digital processing system of claim 26 to further perform generating a recovery block for said loop.

32. The digital processing system of claim 26 wherein said cleanup block is a recovery block.

* * * * *

UNITED STATES PATENT AND TRADEMARK OFFICE
CERTIFICATE OF CORRECTION

PATENT NO. : 6,539,541 B1
DATED : March 25, 2003
INVENTOR(S) : Geva

It is certified that error appears in the above-identified patent and that said Letters Patent is hereby corrected as shown below:

Column 2,
Between lines 65 and 66, insert -- $I = I + 3$ --.

Column 10,
Line 5, before "optimize", delete "is".
Line 67, before "factor", delete "to".

Column 15,
Line 27, delete "R3 load y", insert -- $R3 = load\ y$ --.

Signed and Sealed this

Tenth Day of June, 2003

JAMES E. ROGAN
*Director of the United States Patent and Trademark Office*